US008701056B1

(12) United States Patent
Friedberg et al.

(10) Patent No.: US 8,701,056 B1
(45) Date of Patent: Apr. 15, 2014

(54) AUTOMATED REPAIR METHOD AND SYSTEM FOR DOUBLE PATTERNING CONFLICTS

(71) Applicant: Synopsys, Inc., Mountain View, CA (US)

(72) Inventors: Paul David Friedberg, Sunnyvale, CA (US); Tong Gao, Cupertino, CA (US); Weiping Fang, Fremont, CA (US); Yang-Shan Tong, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/628,002

(22) Filed: Sep. 26, 2012

(51) Int. Cl.
*G06F 17/50* (2006.01)
(52) U.S. Cl.
USPC .......................................................... 716/55
(58) Field of Classification Search
USPC .......................................... 716/100, 55, 110
See application file for complete search history.

(56) References Cited

U.S. PATENT DOCUMENTS

| 8,245,174 B2* | 8/2012 | Cheng et al. ................... 716/126 |
| 8,327,301 B2* | 12/2012 | Cheng et al. ..................... 716/55 |
| 8,359,556 B1* | 1/2013 | Abou Ghaida et al. .......... 716/54 |
| 8,448,100 B1* | 5/2013 | Lin et al. ........................... 716/54 |
| 8,549,458 B2* | 10/2013 | Sezginer ......................... 716/126 |
| 2010/0199253 A1* | 8/2010 | Cheng et al. ..................... 716/13 |
| 2011/0003254 A1* | 1/2011 | Chang et al. ................... 430/322 |
| 2011/0004858 A1* | 1/2011 | Chang et al. .................. 716/122 |
| 2011/0219341 A1* | 9/2011 | Cao et al. ......................... 716/50 |
| 2012/0196230 A1* | 8/2012 | Cho et al. ....................... 430/319 |
| 2012/0216157 A1* | 8/2012 | Luo et al. .......................... 716/55 |
| 2013/0007674 A1* | 1/2013 | Abou Ghaida et al. .......... 716/52 |
| 2013/0024822 A1* | 1/2013 | Hsieh et al. ...................... 716/52 |

* cited by examiner

*Primary Examiner* — Suchin Parihar
(74) *Attorney, Agent, or Firm* — Bever, Hoffman & Harms, LLP; Jeanette S. Harms

(57) ABSTRACT

A method of performing double patterning (DPT) conflict repairs is described. In this method, even cycles adjacent to odd cycles in a layout can be identified (also called adjacent even/odd cycles herein). The identifying can include forming graph constructs of the layout. Route guidances for break-link operations and split-node operations can be prioritized for the adjacent even/odd cycles. A list including the route guidances for the break-link operations and the split-node operations can be generated. The list can be ordered based on the prioritizing.

37 Claims, 16 Drawing Sheets

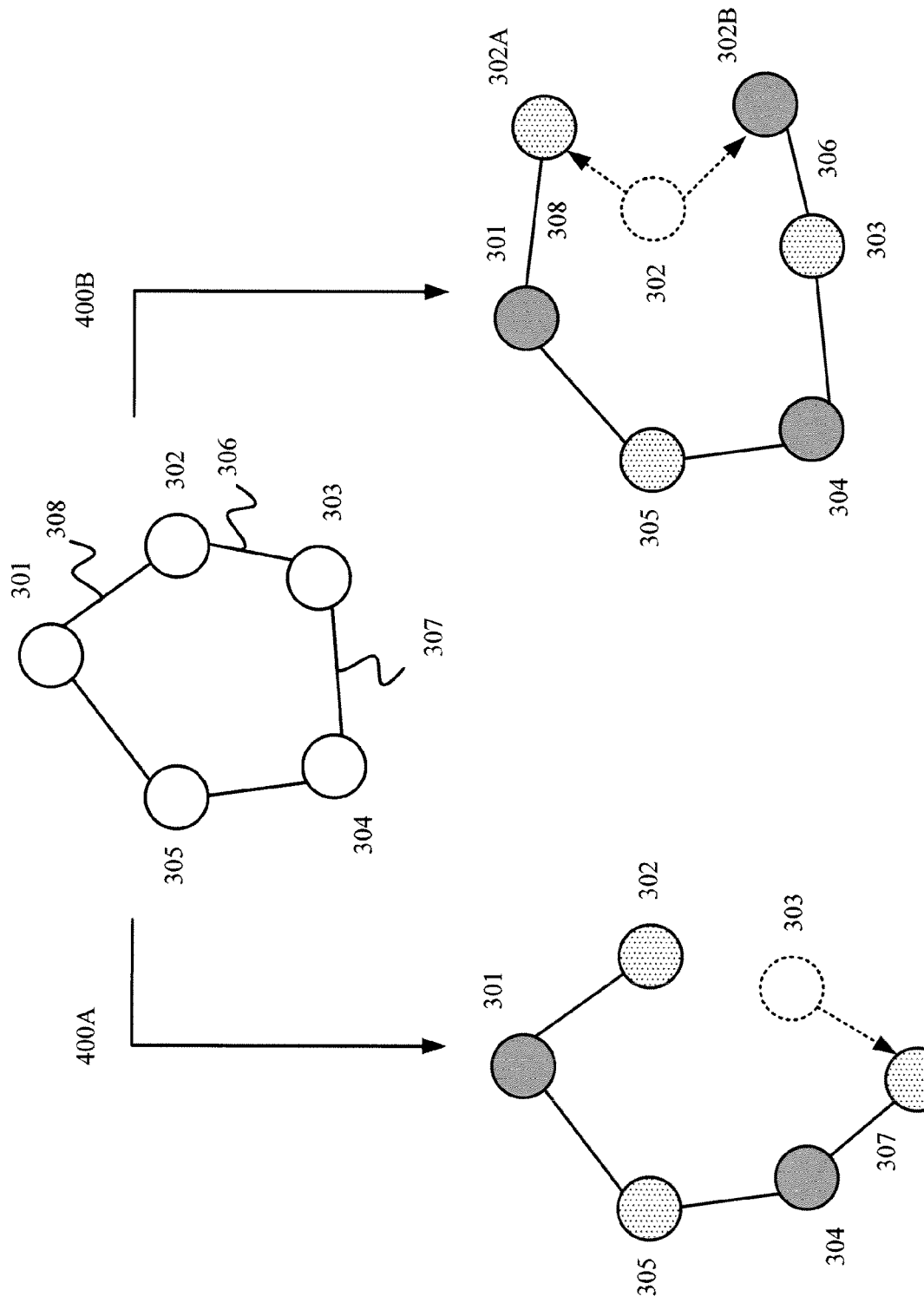

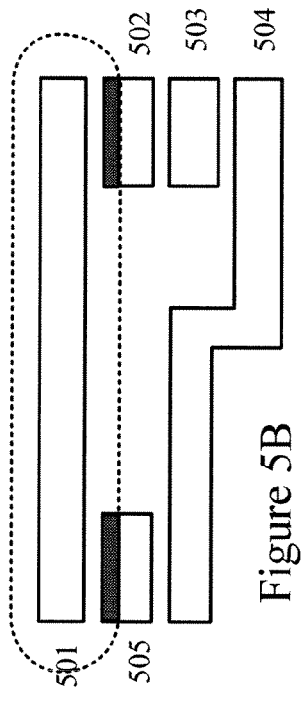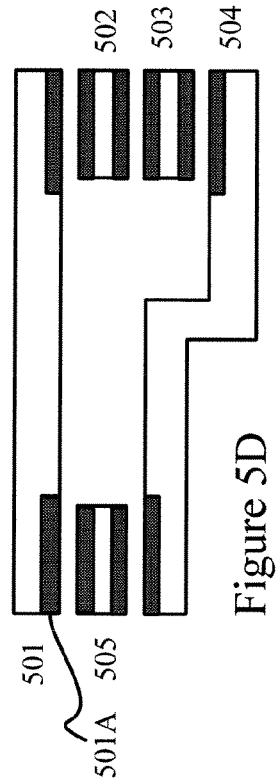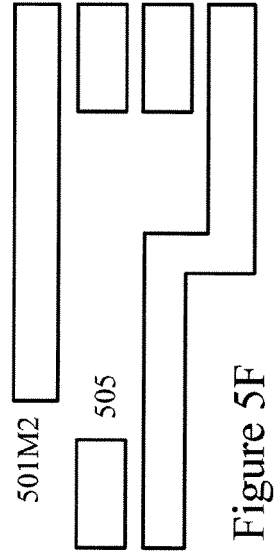
Figure 5B
Figure 5D
Figure 5F
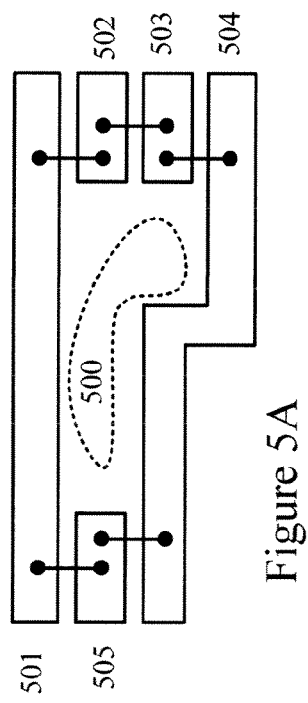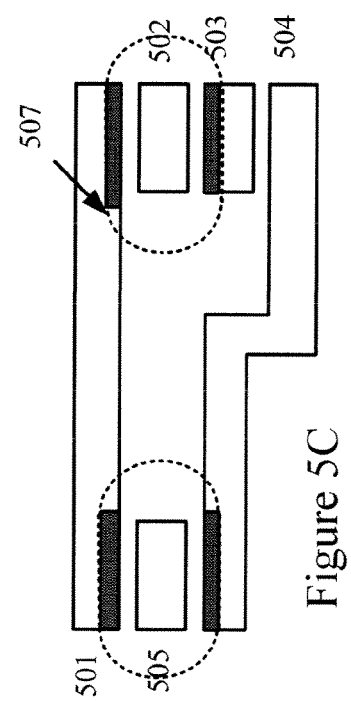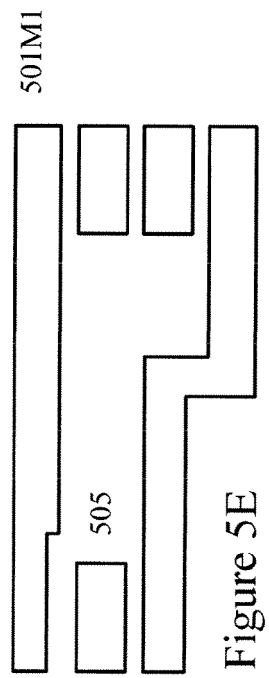
Figure 5A
Figure 5C
Figure 5E

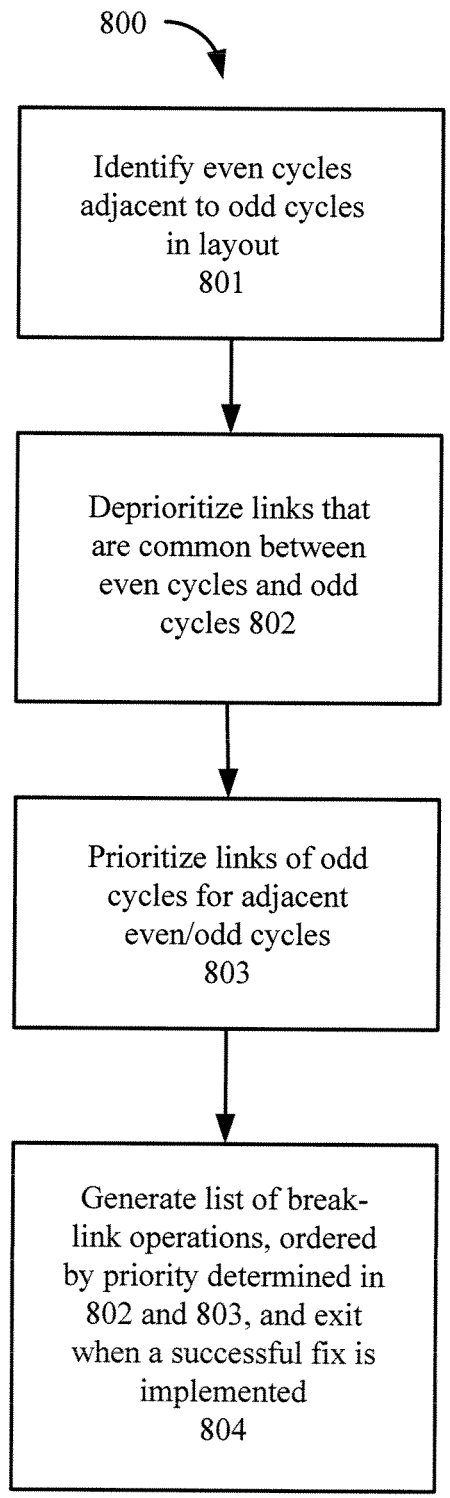
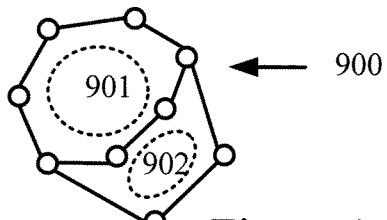
Figure 9A
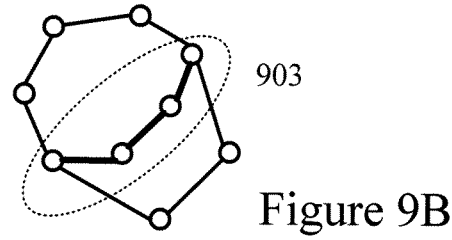
Figure 9B
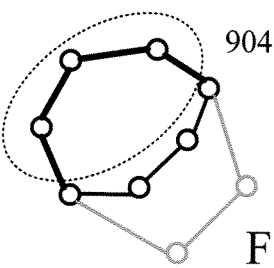
Figure 9C
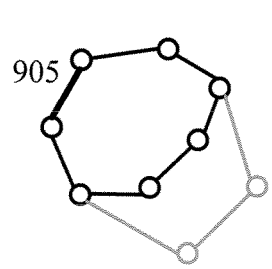
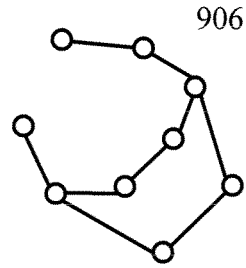
Figure 9D   Figure 9E
Figure 8

AUTOMATED REPAIR METHOD AND SYSTEM FOR DOUBLE PATTERNING CONFLICTS

BACKGROUND

The disclosure relates to double patterning and in particular to providing an automated repair flow for double patterning conflicts.

RELATED ART

The resolution of a photolithographic pattern transfer process reaches its limit at approximately 40 nm half-pitch. To address this problem, a technique called double patterning can be used to achieve necessary feature density below 40 nm half-pitch. Double patterning is a technique that uses a double exposure using photoresist to create a pattern in a target layer. For example, FIG. 1A illustrates a first photoresist layer 103 formed on a hard mask layer 102, which in turn is formed on a target (e.g. semiconductor) layer 101, all of which is formed on a substrate 100. In a first exposure, photoresist layer 103 is exposed to a first exposure pattern, which results in a patterned photoresist layer 103P shown in FIG. 1B. In one embodiment, this pattern has a 128 nm pitch, as shown. This first exposure is followed by a first etch into hard mask layer 102, which forms a patterned hard mask layer 102P shown in FIG. 1C. At this point, a second photoresist layer 104 is formed over patterned hard mask layer 102P as shown in FIG. 1D. In a second exposure, photoresist layer 104 is exposed to a second exposure pattern, which results in a patterned photoresist layer 104P shown in FIG. 1E. Note that this pattern also has the same pitch as the first pattern, e.g. 128 nm. This second exposure is followed by a second etch, this time into target layer 101, which forms a patterned target layer 101P shown in FIG. 1F. FIG. 1G shows patterned target layer 101P after removal of the patterned hard mask layer 102P and patterned photoresist layer 104P. Notably, the pitch of patterned target layer 101P is significantly smaller than that of the previous photoresist patterns. In one embodiment, the pitch of patterned target layer 101P is 64 nm. As shown by FIGS. 1A-1G, using double patterning can allow the manufacture of minimum pitch features in current layouts. Therefore, double patterning is highly desirable to increase feature density in semiconductors.

To create patterns 103 and 104 (FIGS. 1A and 1B), each exposure requires a different photomask (mask). The determination of which features of a layout should be assigned to patterning provided by each mask is clear cut when all features are parallel and formed "on-track". For example, FIG. 2A illustrates three features 201, 202, and 203 of a layout that are positioned on tracks 1, 2, and 3, respectively. Note that tracks are used in layout for the positioning of the features and do not constitute features themselves. In FIG. 2A, because features 201, 202, and 203 are straight lines on adjacent tracks, the assignment to two masks is simple, e.g. features 201 and 203 can be formed on a mask 1, whereas feature 202 can be formed on a mask 2.

This assignment becomes more complex for features having non-preferred routing shapes or positions. For example, FIG. 2B illustrates three exemplary features 204, 205, and 206 having non-preferred routing shapes or positions. Feature 204 has a short arm that extends half-way between tracks 1 and 2. Feature 205 is a straight line, but is positioned half-way between tracks 2 and 3. Feature 206 has an arm that extends across three tracks 1, 2, and 3. The assignment of features 201, 202, and 203 for photoresist patterning to one of two masks becomes significantly more challenging when considering the millions of features included in state of the art layouts.

For a double patterning process at advanced nodes (e.g. 20 nm, 14 nm, and beyond), a place and route tool must generate features that can be legally decomposed onto two masks for the above-described separate photolithography steps. Most decomposition-related conflicts are prevented during place and route by adherence to defined rules. However, to avoid an overly conservative routing solution, some conflicts may be intentionally left in the layout.

A conflict arises when one layout feature is placed too close to another layout feature and both layout features are current assigned to a same mask for patterning. For example, referring to FIG. 3A, nodes 301-305 represent double patterning (DPT) linked routing shapes (i.e. features) in a layout that cannot be legally assigned to two masks. Note that a "link" does not represent a physical or electrical connection, but is a graph construct formed when two nodes are within a predetermined distance from each other. Therefore, nodes and links can be used to capture the above-described decomposition problem. Referring to FIG. 3B, nodes 301, 303, and 304 have been assigned to one mask, whereas nodes 302 and 305 have been assigned to another mask (as shown by the different fill pattern in FIG. 3B, and is called in graph construct "coloring" because the nodes are assigned actual colors, such as red and blue to designate mask assignment). However, nodes 303 and 304 are too close together (i.e. closer than a predetermined distance) to be legally assigned to the same mask. Therefore, a double patterning conflict 306 arises (also called a "color" conflict in graph construct).

An increasing challenge in the industry is automatically repairing double patterning conflicts within the place and route flow, thereby achieving optimized quality of result (QOR) without sacrificing tool efficiency.

SUMMARY

A method of performing double patterning (DPT) conflict repairs is described. In this method, even cycles adjacent to odd cycles in a layout can be identified (also called adjacent even/odd cycles herein). The identifying can include forming graph constructs of the layout. Route guidances for break-link operations and split-node operations can be prioritized for the adjacent even/odd cycles. A list including the route guidances for the break-link operations and the split-node operations can be generated. The list can be ordered based on the prioritizing.

Prioritizing the route guidances for the break-link operations can include de-prioritizing a first set of links of the adjacent even/odd cycles that are common between the even cycles and the odd cycles. A second set of links in the odd cycles of the adjacent even/odd cycles can be prioritized.

In one embodiment, the de-prioritizing can include assigning a lowest priority to the first set. The prioritizing can include assigning a highest priority to any links of the second set that repair multiple odd cycles. The prioritizing can further include assigning an intermediate priority to any links of the second set that repair single odd cycles.

Prioritizing the route guidances for the split-node operations can be performed based on interactions with the adjacent even/odd cycles. Each route guidance is a potential cut having a specific location on a feature represented by a node. An interaction for the potential cut is calculated by subtracting a first number of even cycles interacting with the potential cut from a second number of odd cycles interacting with the potential cut.

The method can further include determining DPT-critical regions of the layout. In one embodiment, the break-link operations can be performed only in the DPT critical regions, whereas the split-node operations can be performed only in the non-DPT critical regions.

Repairs of the DPT conflicts can be performed using the list. In one embodiment, the repairing can include performing multiple break-link operations for one adjacent even/odd cycle.

A non-transitory, computer-readable medium storing computer-executable instructions for performing double patterning (DPT) conflict repairs is also described. The instructions when executed by a processor cause the processor to execute a process as described herein. A system for performing double patterning (DPT) conflict repairs is also described. This system includes a processor configured to perform the process described herein.

BRIEF DESCRIPTION OF THE DRAWINGS

FIG. 4 illustrates how an odd cycle can be evaluated for DPT conflict repair using a dual-pronged route guidance approach.

FIGS. 5A-5F illustrate a shape projection technique that can be used to perform a break-link operation.

FIG. 8 illustrates an exemplary DPT conflict repair technique for break-link operations including prioritization.

FIGS. 9A-9E illustrate exemplary graph constructs with links corresponding to features described in FIG. 8.

FIG. 11B further illustrates exemplary potential cuts to explain a split-node operation.

DETAILED DESCRIPTION OF THE DRAWINGS

Figure 1A:
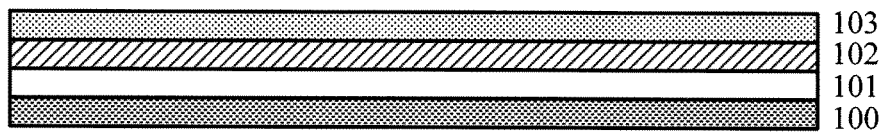
FIGS. 1A-1G illustrate an exemplary DPT process.
Figure 1B:
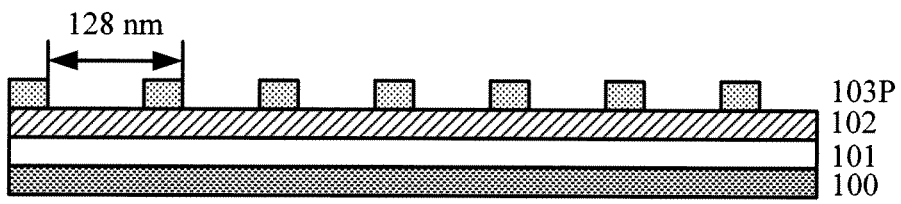
Figure 1C:
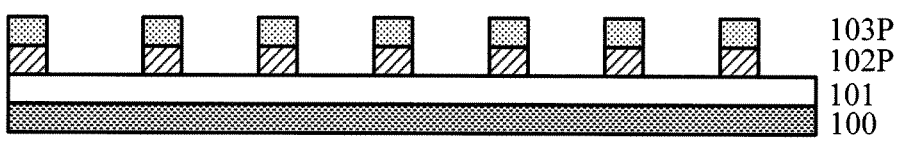
Figure 1D:
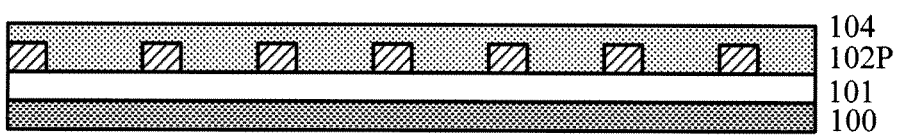
Figure 1E:
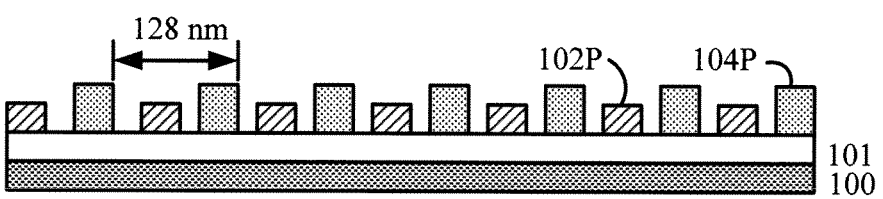
Figure 1F:
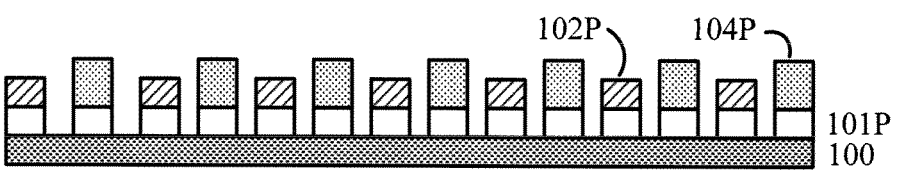
Figure 1G:
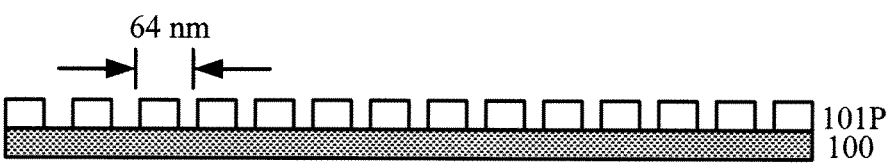
Figure 2A:
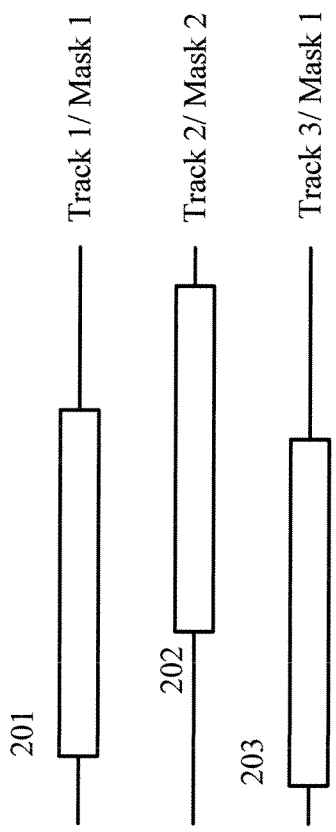
FIG. 2A illustrate line features located only on tracks of the layout, thereby simplifying DPT.
Figure 2B:
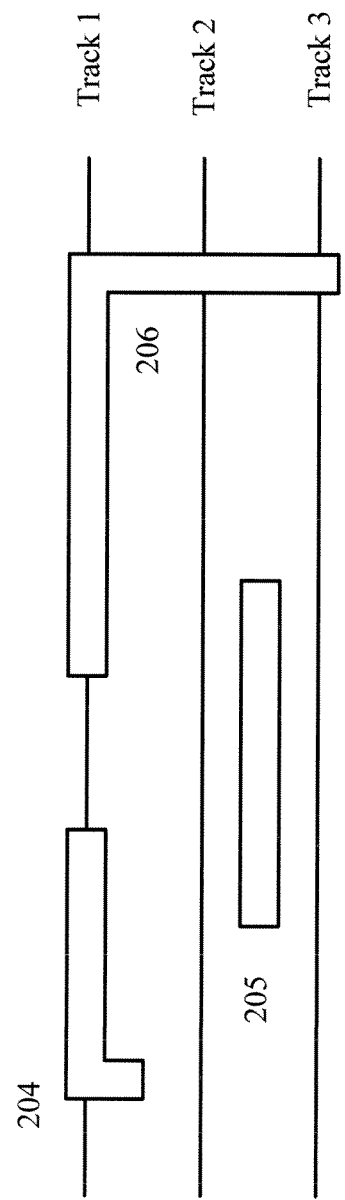
FIG. 2B illustrate features having non-preferred routing shapes or positions, thereby complicating DPT.
Figure 3B:
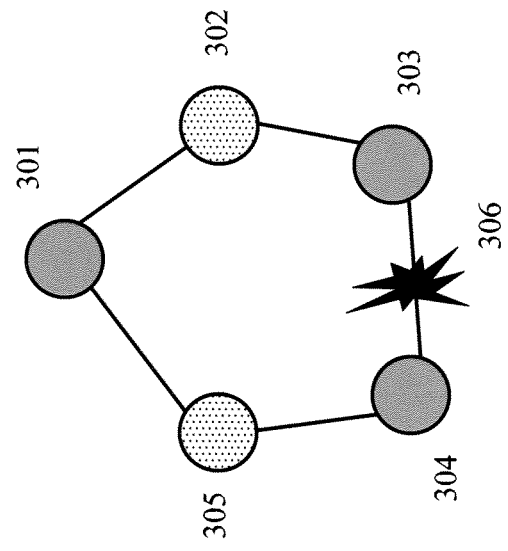
FIGS. 3A and 3B illustrate a DPT conflict created by an odd cycle.
Figure 3A:
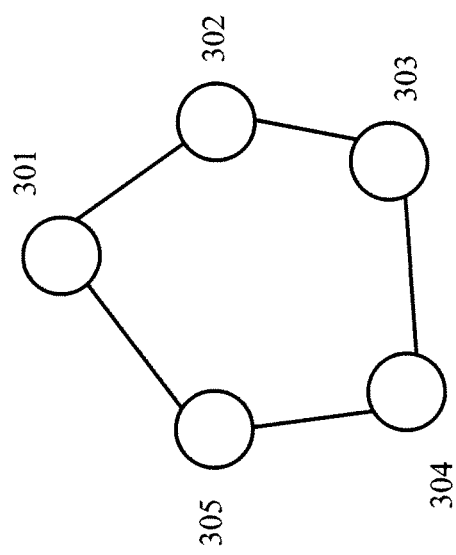

An improved double patterning repair technique described herein can identify key nodes and links for resolving color conflicts. As described above, nodes represent features (or generically, polygons), and links represent relationships formed when nodes are closer than the DPT-critical spacing. As used herein, the term "cycle" refers to a set of DPT-linked routing shapes forming a closed loop. Cycles can be odd or even based on the number of nodes. For example, the DPT-linked routing shapes of FIG. 3A constitute an "odd" cycle because of the odd number of nodes therein. Excluding coloring conflicts arising from pre-colored nodes, odd cycles are the only cause of color conflicts that arise in a layout. A "long-range" odd cycle typically spans multiple routing partitions (e.g. on the order of tens of microns) (wherein partitions are local windows in which a routing problem is incrementally solved). Repairing long-range odd cycles using standard routing engine tools is prohibitively expensive due to design complexity. For example, there may be many nodes and links in even a single cycle. Additionally, one odd cycle may be nested within a larger odd cycle, which in turn may also be nested in yet a larger odd cycle, etc. Solving the DPT conflict with these design layouts is highly challenging.

In accordance with an improved DPT conflict repair technique, possible points for repair of an odd cycle can be evaluated with two types of route guidance: a break-link operation and a split-node operation. The break-link operation shifts a first node away from a second node to satisfy the minimum DPT-safe spacing distance, thereby "breaking" a link between the first and second nodes. The split-node operation splits a node into two nodes, which are placed to provide a minimum DPT-safe spacing distance therebetween. Both the break-link operation and the split-node operation result in an "open" network in which two nodes in a plurality of linked nodes have only one link.

FIG. 4 illustrates how an odd cycle including nodes 301-305 (FIG. 3A) can be evaluated for DPT conflict repair using this dual-pronged route guidance approach. A break-link operation 400A can include shifting node 303 to satisfy the minimum DPT-safe spacing value with respect to node 302, thereby effectively breaking a link 306 and creating an open network. Note that when link 306 between nodes 302 and 303 is broken, node 303 can then be colored the same as node 302 (and node 305). Thus, an alternating color sequence can be achieved and all DPT conflicts have been resolved.

A split-node operation 400B can include splitting node 302 into two nodes 302A and 302B. Because nodes 302A and 302B are placed the minimum DPT-safe spacing value apart as a result of the operation, the odd cycle has been transformed into an open network. Note that node 302A can then be colored the opposite of node 301, and node 302B can then be colored the opposite of node 303. Thus, once again, an alternating color sequence can be achieved, which indicates no DPT conflicts.

As indicated previously, both break-link operation 400A and split-node operation 400B result in open networks. For example, in break-link operation 400A, each of nodes 302 and 303 have only one link. Similarly, in break-link operation 400B, each of nodes 302A and 302B have only one link.

FIGS. 5A-5D illustrate a shape projection technique that can be used to perform a break-link operation. In this technique, an odd cycle is first identified. FIG. 5A illustrates an exemplary odd cycle 500 including features 501-505 (links are shown for context). A shape projection from each feature can then be provided onto its nearest neighbor feature based on the DPT spacing rules. FIG. 5B illustrates the shape projections of feature 501 onto linked features 502 and 505, wherein the shape projections are shown as shaded portions. FIG. 5C illustrates the shape projections of features 502 and 505 onto the linked features 501, 503, and 504. Note that any rounded corners formed based on shape projections (see, e.g. rounded corner 507) (see also FIG. 6E below) can be squared for simplicity. FIG. 5D illustrates the shape projections of all features 501-505 onto their nearest linked features. These shaded portions are called DPT critical regions herein.

To perform the break-link operation any one of the DPT critical regions of a feature can be removed. For example, a DPT critical region 501A can be removed, which results in an open network. That is, the distance between the resulting modified feature 501M1, shown in FIG. 5E, and feature 505 (not modified) will be greater than the minimum DPT-safe spacing value. Therefore, an odd cycle is not formed. In another embodiment shown in FIG. 5F, feature 501 can be further shortened at the location indicated by DPT critical region 501A to generate a modified feature 501M2, thereby also resulting in an open network.

Figure 6A:
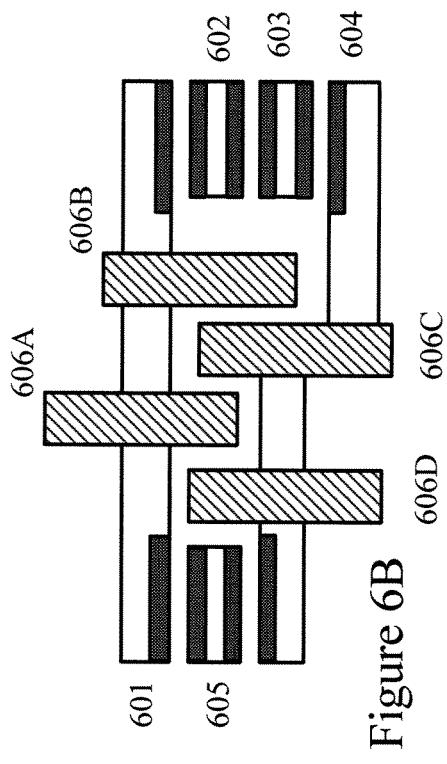
FIGS. 6A-6D illustrate a cutting technique that can be used to perform a split-node operation.
Figure 6C:
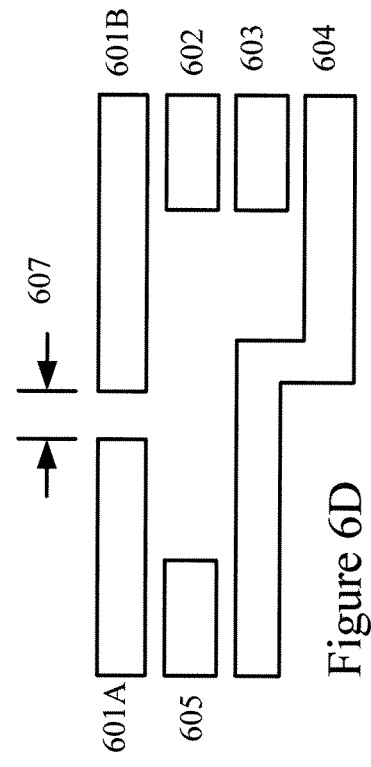
Figure 6B:
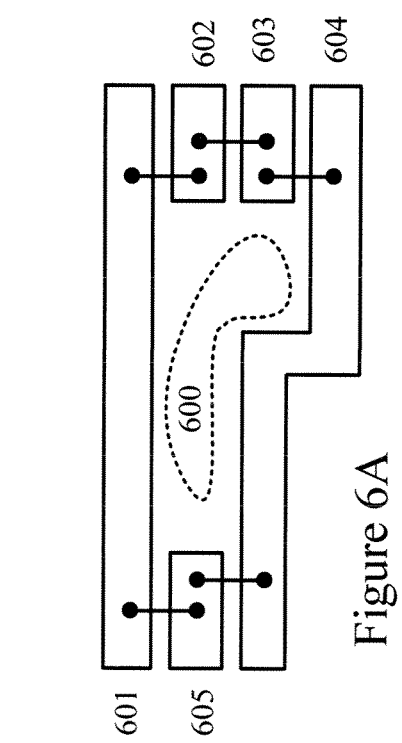

FIGS. 6A-6D illustrate a cutting technique that can be used to perform a split-node operation. In this technique, an odd cycle is first identified. FIG. 6A illustrates an exemplary odd cycle 600 including features 601-605 (links are shown for context). At this point, the DPT-critical regions (described in FIG. 5D) for the odd cycle can be determined. FIG. 6B illustrates exemplary DPT critical regions for odd cycle 600 (shown as shaded portions).

In accordance with the cutting technique, a plurality of potential cuts 606A-606C can be designated for odd cycle 600. These potential cuts, which are perpendicular to the preferred routing direction (in FIGS. 6A-6D, the preferred routing direction is horizontal), can be anywhere except for the DPT critical regions. Note that any arrangement of potential cuts can be made, e.g. two adjacent cuts on each of features 601 and 604, four adjacent cuts on feature 601, four adjacent cuts on feature 604, or alternating cuts on features 601 and 604. To provide increased router flexibility, alternating potential cuts (as shown in FIG. 6B) can be used in one embodiment.

Figure 6D:
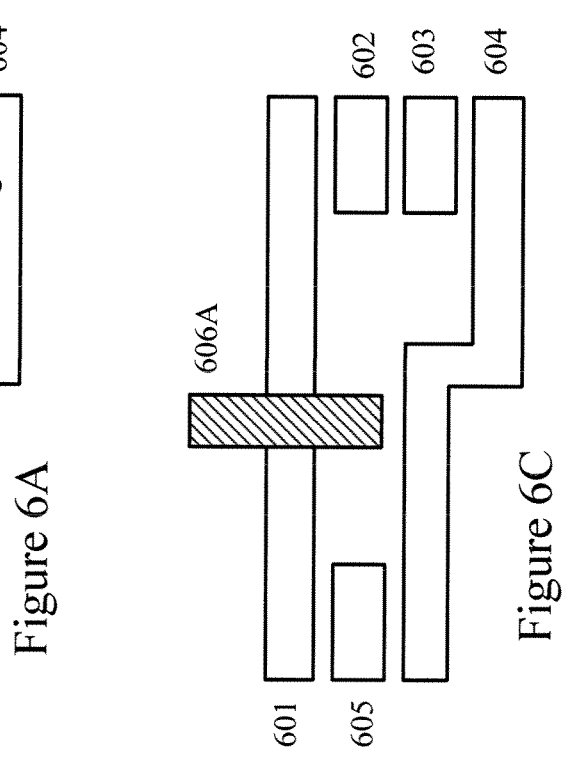

In one preferred embodiment, each potential cut 606A-606D has a width equal to or greater than the minimum DPT-safe spacing value. After a specific potential cut is selected, its associated feature can be divided into two features with a spacing therebetween of at least the minimum DPT-safe spacing value. FIG. 6C illustrates potential cut 606A being selected, and FIG. 6D illustrates features 601A and 601B, formed from cutting feature 601, and having a spacing of 607, which is the minimum DPT-safe spacing value.

Figure 6G:
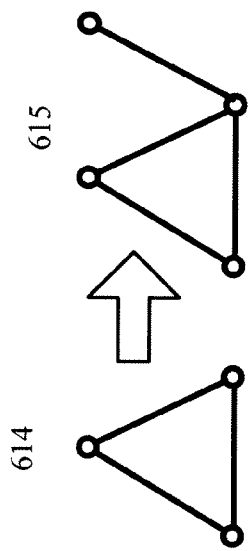
FIGS. 6E-6G illustrate how inappropriate node splitting can complicate DPT conflict repair.
Figure 6E:
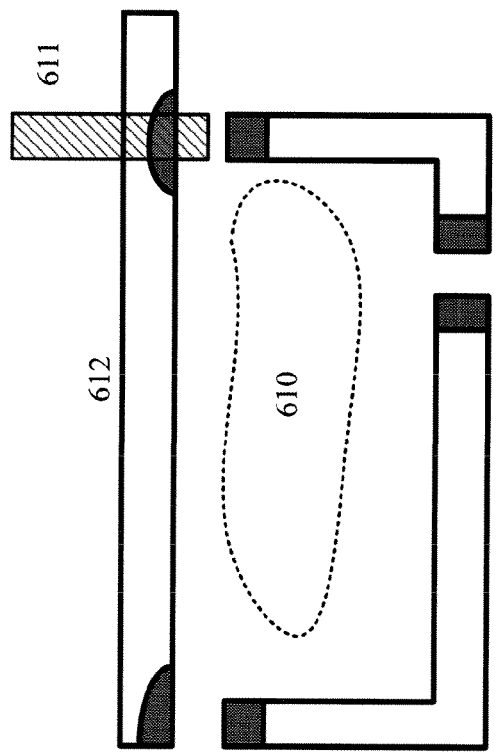
Figure 6F:
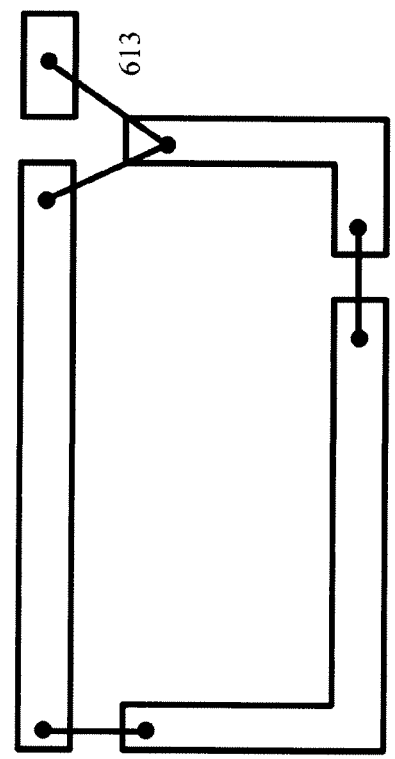

Note that placing potential cuts on the DPT critical regions (contrary to the above-described split-node operation) can result in highly undesirable DPT conflict complexity. For example, FIG. 6E illustrates an odd cycle 610 with DPT critical regions shown as shaded portions. A potential cut 611 has been placed on one DPT critical region of feature 612. If potential cut 611 is made, odd cycle 610 remains and an additional link is created, as shown in FIG. 6F. FIG. 6G illustrates a graph construct of the before node/link configuration 614 and the after node/link configuration 615. Resolving the DPT conflict of configuration 615 is more challenging than configuration 614 even without nesting.

Figure 7A:
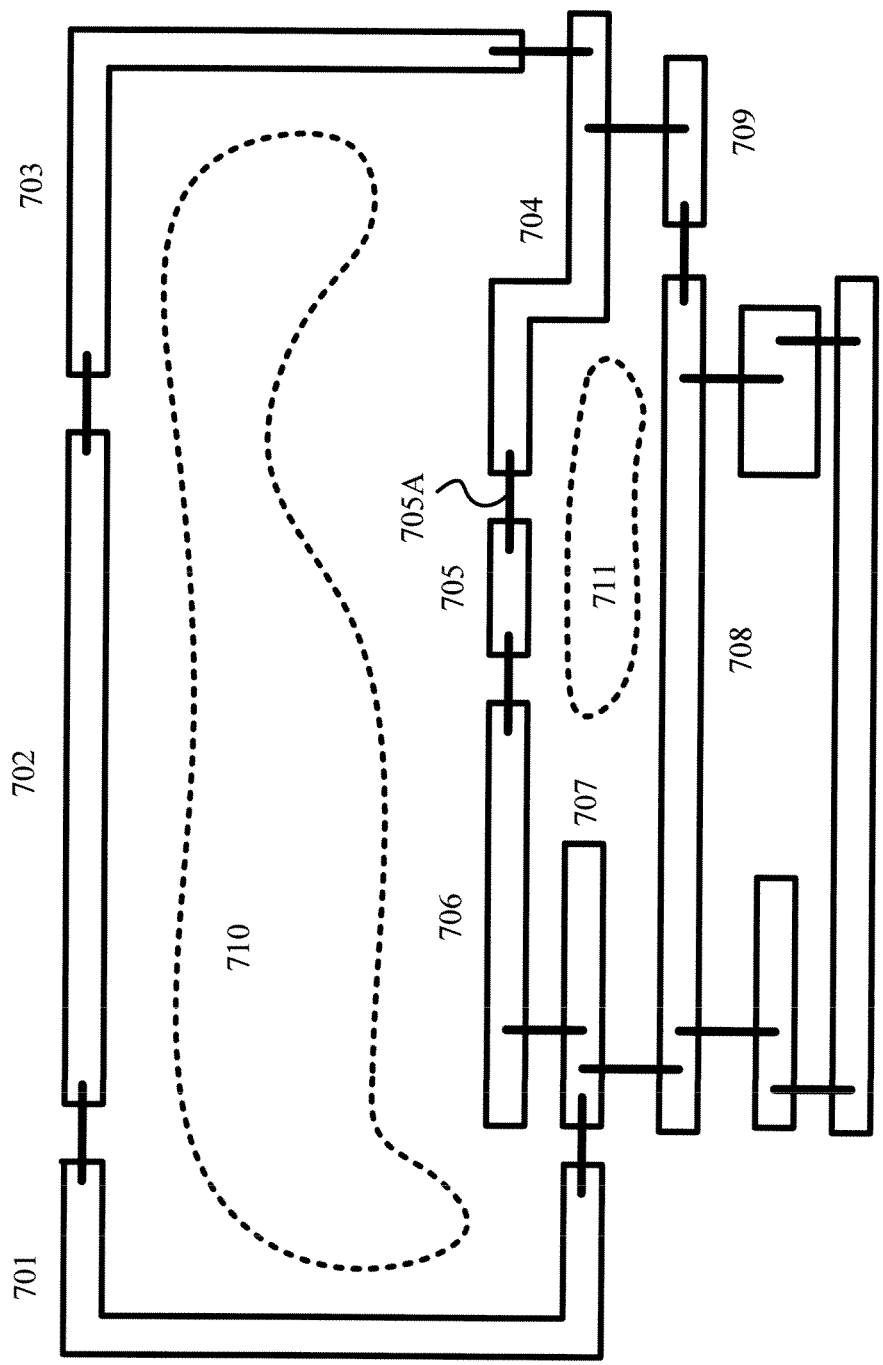
FIGS. 7A-7B illustrate how inappropriate link breaking can lead to larger odd cycles.
Figure 7B:
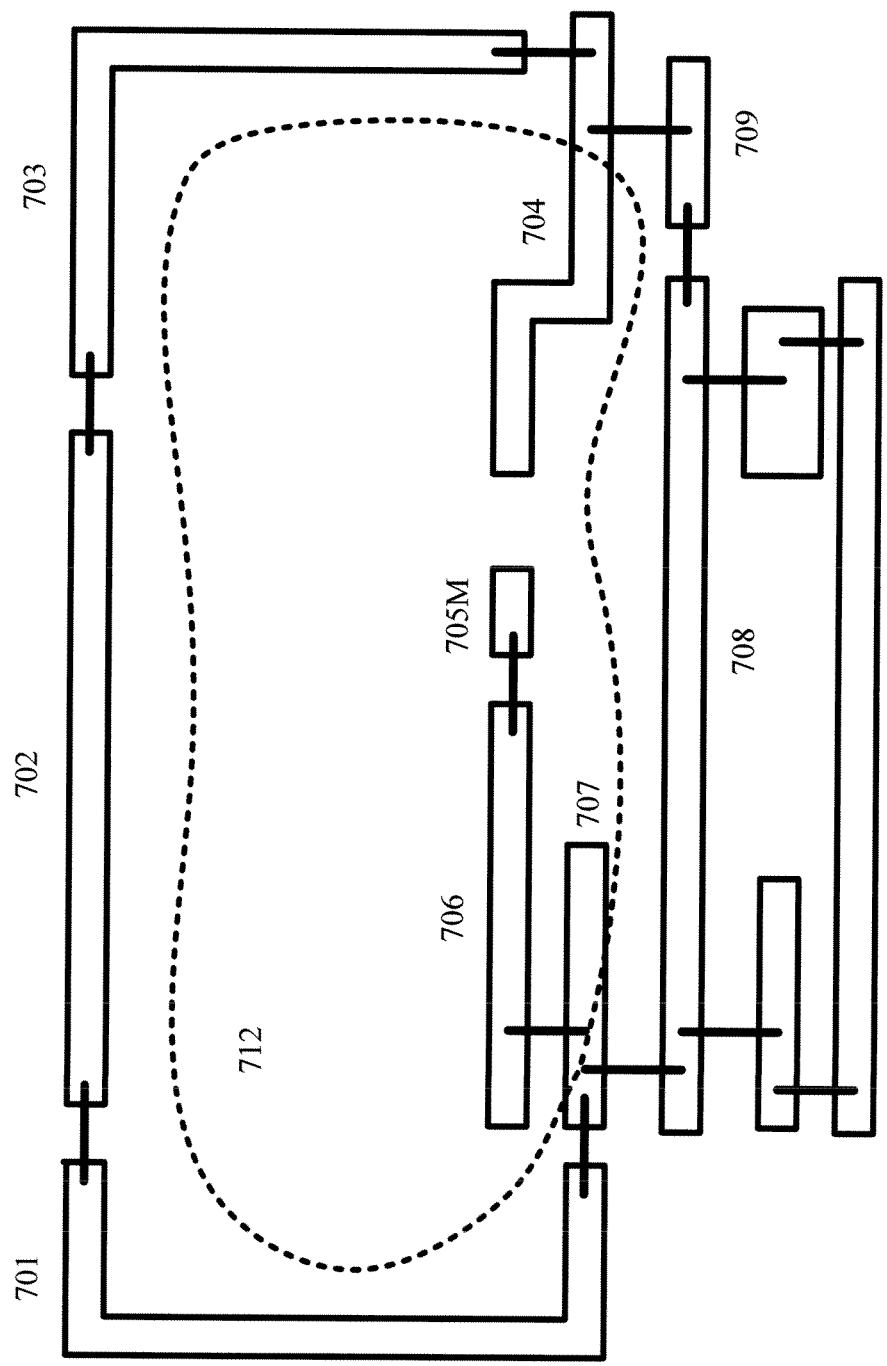
Figure 10A:
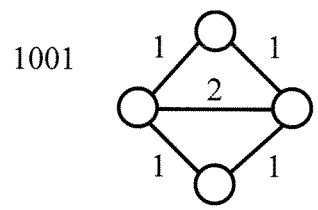
FIGS. 10A-10D illustrate exemplary adjacent even/odd cycles with exemplary prioritization values.
Figure 10B:
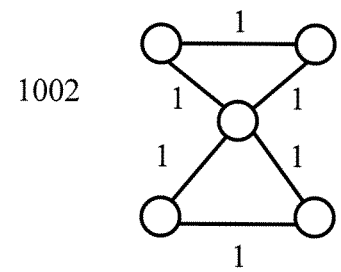
Figure 10C:
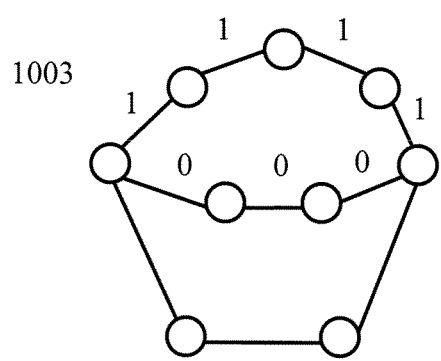
Figure 10D:
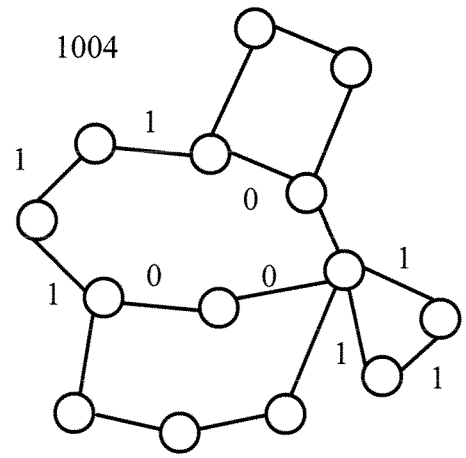

Notably, each route guidance is guaranteed to repair one odd cycle DPT conflict when it is successfully executed. However, arbitrarily selecting a link for breaking or a node for splitting in the context of the layout may not repair the long-range DPT conflict. For example, FIG. 7A illustrates an exemplary layout including features 701-709. Features 701-706 form an odd cycle 710 (note that DPT links are shown for context and would not be part of the layout), whereas features 704-709 form an adjacent even cycle 711. Arbitrarily selecting feature 705 for a split-node operation or link 705A for a break-link operation would repair the DPT conflict in odd cycle 710, but create a larger odd cycle. (For this reason, odd cycle 710 is called a "core" odd cycle.) Specifically, as shown in FIG. 7B, a new, larger odd cycle 512 including features 701, 702, 703, 704, 709, 708, and 707 is created (a break-link operation for link 705A is shown for convenience, but a split-node operation for feature/node 704 would have a similar new, larger odd cycle result).

Unfortunately, odd cycles are frequently nested, i.e. because of adjacent even/odd cycles. Therefore, selecting the wrong break-link/split-node operation can result in an unsuccessful long-range DPT solution. To avoid such convergence problems, the route guidances can be prioritized through graph analysis (i.e. using nodes and links) to optimize the efficiency of the repairs.

FIG. 8 illustrates an exemplary DPT conflict repair technique 800 including prioritization of links for break-link operations. In step 801, even and odd cycles in the layout can be identified using graph constructs. More specifically, any even cycles that are adjacent to odd cycles in the graph constructs can be identified. FIG. 9A illustrates an exemplary graph construct 900 showing an odd cycle 901 adjacent to an even cycle 902 (also called an adjacent even/odd cycle herein). Step 802 can de-prioritize any links that are common between the even and odd cycles (note that links only part of adjacent even cycles are given no route guidance priority and thus are effectively ignored). FIG. 9B illustrates a set 903 of the links common between even cycle 902 and odd cycle 901; links given no route guidance priority (i.e. those links only part of the adjacent even cycle) are shown in gray. In one embodiment, a de-prioritized link can be assigned the lowest priority level (e.g. a priority of "0"). Note that in practice, operations with links having a lowest priority are virtually never attempted; however, these links can be stored as backup options for the router. Specifically, if no higher-priority link can be identified in an especially complex graph, it may be necessary to use break-link operations on lowest-priority links to gradually manipulate the graph until an operation on a higher-priority link (one that fixes all nested cycles) is possible (described in further detail below).

Step 803 can prioritize the remaining links that form part of adjacent even/odd cycles. In one embodiment, a highest priority can be given to links that are common to multiple odd cycles. FIG. 9C illustrates a set 904 of links that are common to multiple odd cycles (i.e. a 7-node odd cycle (odd cycle 901), and a larger 7-node odd cycle that nests the first (combined odd cycles 901+902)). Step 804 can generate a list of break-link operations ordered by priority (based on steps 802 and 803), and exit when a successful DPT solution is implemented. FIG. 9D illustrates that a break-link operation for a link 905 has been detected as a successful fix for a DPT conflict. FIG. 9E illustrates the resulting graph construct 906 after the break-link operation has been implemented.

In one embodiment, for a break-link operation, three priorities can be used. A priority "2" can be given to a link that repairs multiple odd cycles; a priority "1" can be given to a link that repairs single odd cycles; and a priority "0" can be given to a link that is common between even and odd cycles. FIGS. 10A-10D illustrate graph constructs 1001, 1002, 1003, and 1004, respectively, including the above-described link priorities. In this embodiment, a priority 2 link would be evaluated before a priority 1 link, which in turn would be evaluated before a priority 0 link.

A split-node prioritization has additional complexity compared to split-node prioritization because potential cuts can be placed at different locations on a feature, wherein one potential cut may have a different prioritization than another cut based on its ability to correct DPT conflicts. Thus, a node in a graphic construct may have multiple associated split-node operations (corresponding to multiple potential cuts in a feature, each potential cut being a route guidance) with different prioritizations. Therefore, in one embodiment, a split-node operation priority can be calculated by counting a first number of odd cycles that the route guidance associated with a given split-node operation interacts with, and subtracting from the first number a second number of even cycles that the same route guidance for the same operation interacts with.

Figure 11B:
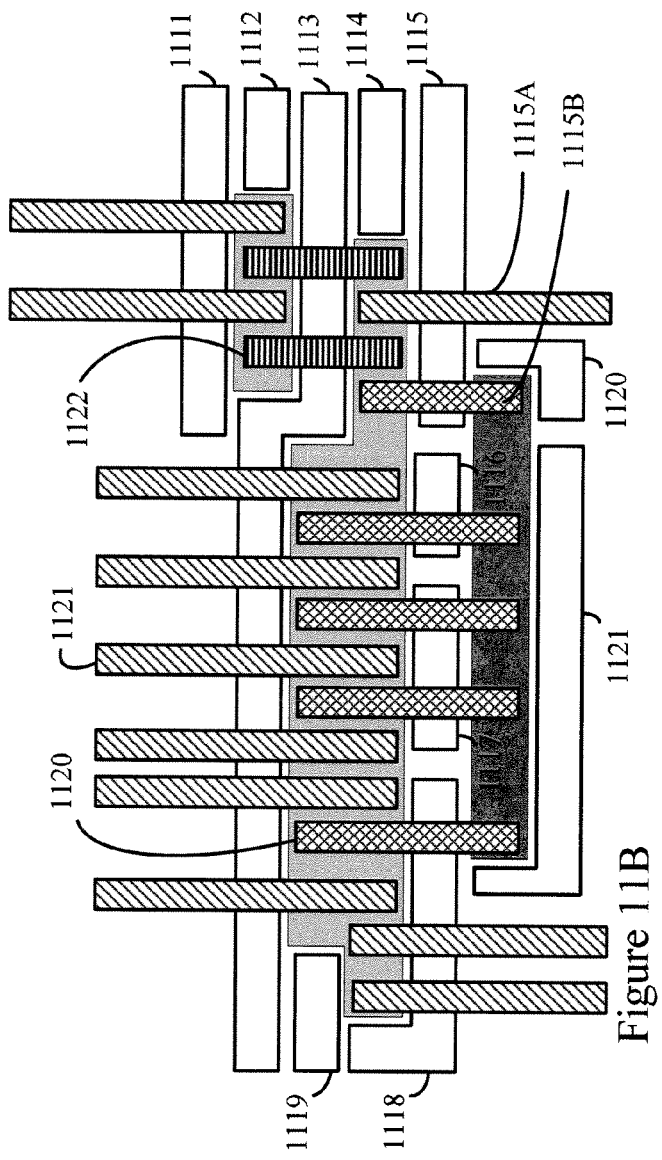
FIG. 11A illustrate a graph construct and FIG. 11B illustrates exemplary layout features that correspond with the graph construct.
Figure 11A:
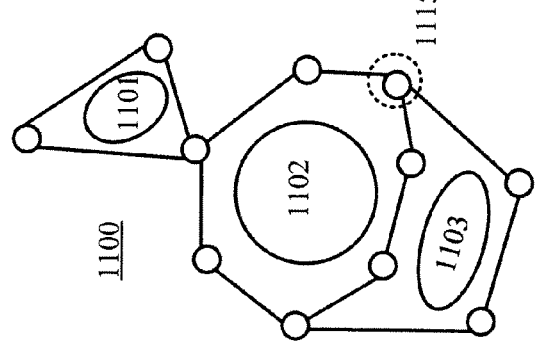

FIG. 11A illustrates an exemplary graph construct 1100 including a first odd cycle 1101, a second odd cycle 1102, and an even cycle 1103. FIG. 11B illustrates exemplary layout features corresponding to the nodes of graph construct 1100. Specifically, features 1111-1113 form first odd cycle 1101; features 1113-1119 form second odd cycle 1102; and features 1115-1118 and 1120-1121 form even cycle 1103. For clarity, feature 1115 of FIG. 11B is indicated in graph construct 1100 of FIG. 11A. FIG. 11B includes exemplary potential cuts 1120, 1121, and 1122 (formed using the techniques described above in reference to FIG. 6B).

Figure 11C:
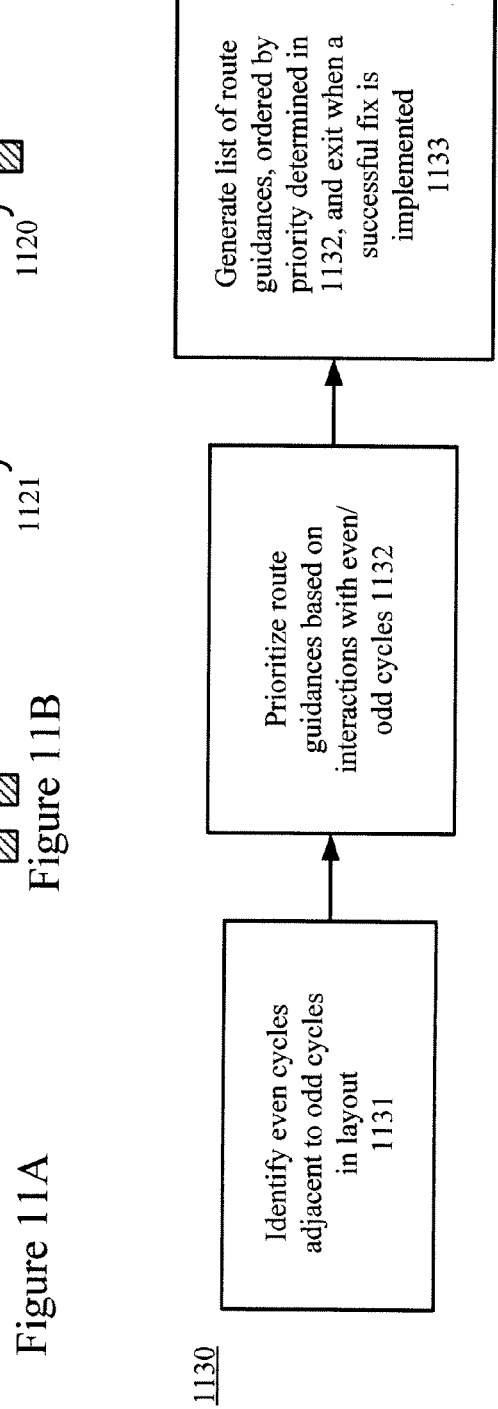
FIG. 11C illustrates an exemplary DPT conflict repair technique for split-node operations including prioritization.

FIG. 11C illustrates an exemplary DPT conflict repair technique 1130 including prioritization of split-node operations. In step 1131, even and odd cycles in the layout can be identified using graph constructs (e.g. cycles 1101-1103 of FIG. 11A). Step 1132 can prioritize route guidances based on interactions with even/odd cycles. Note that the nodes associated only with an even cycle can be effectively ignored (similar to that of the break-link operation). Therefore, referring to FIG. 11B, no potential cuts are placed for features 1121 and 1120. As described above, each potential cut is a route guidance associated with a specific node.

An interaction describes when the potential cut extends into one or more cycles. For ease of visualization, the "holes" (i.e. the insides) of odd cycles 1101 and 1102 have a light gray fill, and the hole of even cycle 1103 has a medium gray fill. In this case, an interaction for a potential cut is determined by how many holes in which it extends. In one embodiment, the potential cuts extend through the holes of the cycles until another feature is reached, or until a specified length is met without encountering a neighboring feature. Extending to the nearest feature or to a predetermined length prevents the router from addressing the operation by simply creating a short jog in the feature, i.e. resolving the route guidance without splitting the node. In one embodiment, the predetermined length can be set to a predetermined number of tracks (e.g. 7 tracks) or an actual distance based on the technology node (e.g. 500 nm).

In one embodiment, the split-node operation associated with a route guidance that interacts with a single odd cycle will have priority 1; a split-node operation whose route guidance interacts with two odd cycles will have priority 2; and a split-node operation whose route guidance interacts with one odd cycle and one even cycle will have priority 0. For example, feature 1115 has two route guidances: a potential cut 1115A and 1115B. Potential cut 1115B interacts with one odd cycle 1102 and one even cycle 1103. However, potential cut 115A interacts with only one odd cycle 1102. Each of potential cuts 1122 interact with two odd cycles 1101 and 1102.

Although the potential cuts of FIG. 11B interact with at most two cycles, it is possible for certain layouts to have interactions with more than two cycles. However, though more than two cycles may interact at a single node, each cut can interact with only two cycles. Step 1132 (FIG. 11C) can be generically described as a route guidance prioritization performed by counting a first number of odd cycles that the route guidance associated with a given split-node operation interacts with, and subtracting from the first number a second number of even cycles that the same route guidance for the same operation interacts with. Since each cut must interact with either 1 or 2 odd cycles, and since each cut must interact with either 0 or 1 even cycles, the priority of split-node operations is bounded between 0 and 2. Potential cuts 1120 have a priority of "0" (1−1=0); potential cuts 1121 have a priority of "1" (1−0=1); and potential cuts 1122 have a priority of "2" (2−0=2). Step 1133 can generate a list of route guidances, ordered by priority as determined in step 1132, and exit when a successful fix is implemented.

In one embodiment, a break-link operation can be generally given a higher priority than a split-node operation for a same result of the odd cycle. This prioritization recognizes that the break-link solution generally requires fewer router resources than that for the split-node solution. However, a split-node operation may be given a higher priority than a break-link operation if a larger number of odd cycles can be repaired—that is, the priority score of a split-node operation exceeds that of a break-link operation.

In one embodiment, the prioritization can be based on the priority values generated by the above-described break-link and split-node operations. For example, the route guidances can include, in order of priority, (1) priority 2 break-link, (2) priority 2 split-node, (3) priority 1 break-link, (4) priority 1 split-node, (5) priority 0 break-link, and (6) priority 0 split-node. As noted above, priority 0 route guidances, although typically not helpful in an immediate resolution, can be effectively used in multi-step DPT conflict resolution.

Note that the router can take into account the functionality desired by the layout and modify the layout accordingly when either break-link or split-node operations are used as DPT conflict solutions. For example, when a node is moved during the break-link process, the router may include additional wiring to ensure identical functionality in the layout is achieved. For a split node, the router may create two vias and an additional wire in another layer to connect the two feature segments (which are generated by the split-node operation). The router can make such subsequent layout modifications based on well-established techniques known by those skilled in the art. Thus, the router when receiving route guidances that change node positions and/or number of nodes can advantageously maintain the necessary connectivity to ensure identical functionality. The router can also address timing, capacitive coupling, and other costs associated with using the route guidances of both break-link and split-node operations.

Notably, in accordance with one aspect of an automated repair flow for DPT conflicts, the router can be given a plurality of prioritized links and/or nodes. The router can then start with a higher priority link/node (arbitrarily chosen from the list) when searching for an optimized routing solution. When a routing solution is found the break-link/split-node operation can be performed on the layout. However, as known by those skilled in the art, should a downstream layout problem arise, the router can return to earlier solutions for re-evaluation. Thus, the routing process is iterative to provide maximum flexibility.

Figure 12A:
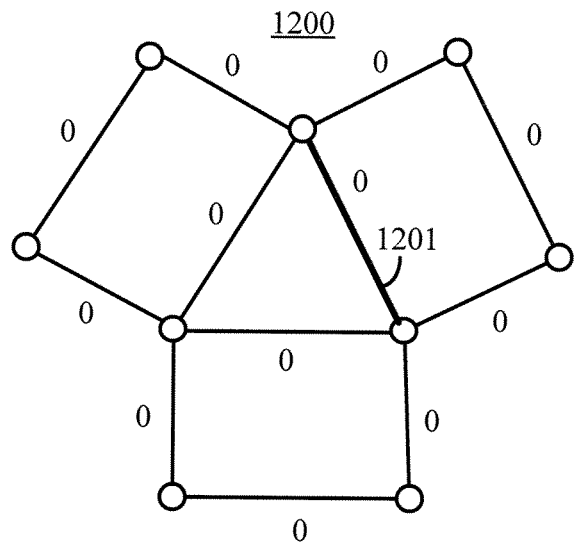
FIGS. 12A-12C illustrate how multiple break-link operations can be used for a problem odd cycle.
Figure 12B:
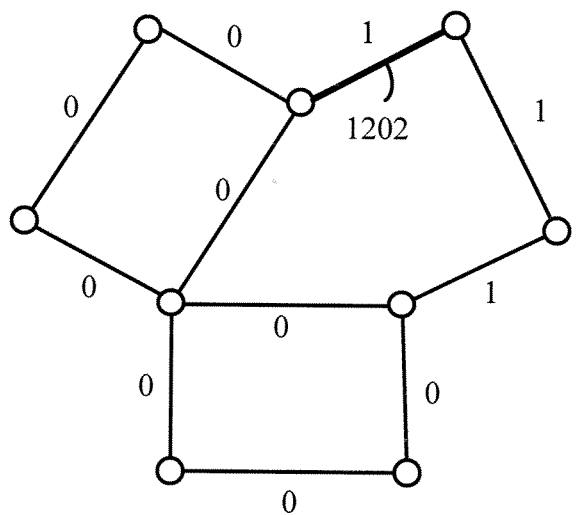
Figure 12C:
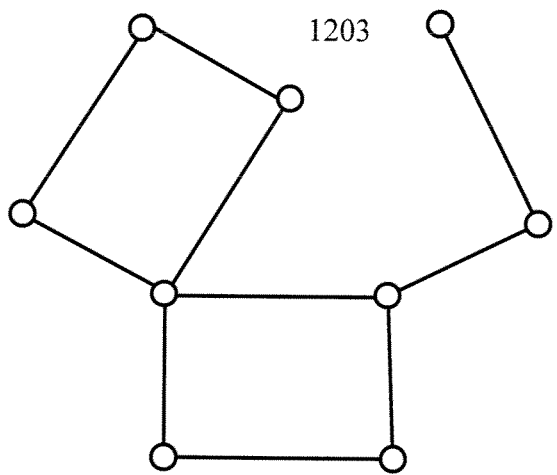

Note that it may be necessary to initially create a larger odd cycle in order to repair a difficult DPT conflict. For example, referring to FIG. 12A, a graph construct 1200 with labeled, prioritized links shows that all links have priority 0. In one embodiment, the router can select one internal link, e.g. link 1101, for a first break-link operation. FIG. 12B shows that this break-link operation creates a larger odd cycle, i.e. a three-link odd cycle turns into a five-link odd cycle. However, at this point, the router can select an external link, e.g. link 1202, for a second break-link operation. FIG. 12C illustrates a graph construct 1203 resulting from the two break-link operations. Note that links associated with an odd cycle having priority 0 are still prioritized above links only associated with even cycles and having priority 0, i.e. link 1202 is only selected after link 1201, not before.

An optimized, automated repair of DPT conflicts is described above. Often times these conflicts are nested so that repair of the current conflict results in occurrence of a new conflict. This possibility is minimized or avoided entirely by prioritization. Layout repairs can be handled internally by the router. Therefore, the solution minimizes physical impact, preserves timing integrity, and ensures a DRC-clean result. As a result of an efficient repair method for lingering odd cycles, the improved routing approach enhances performance by providing an efficient, local and long-range error repair strategy. Moreover, the automated repair technique does not need to exercise overly conservative constraints to guarantee 100% odd cycle avoidance.

The automated technique for DPT conflict repair can be implemented in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Figure 13:
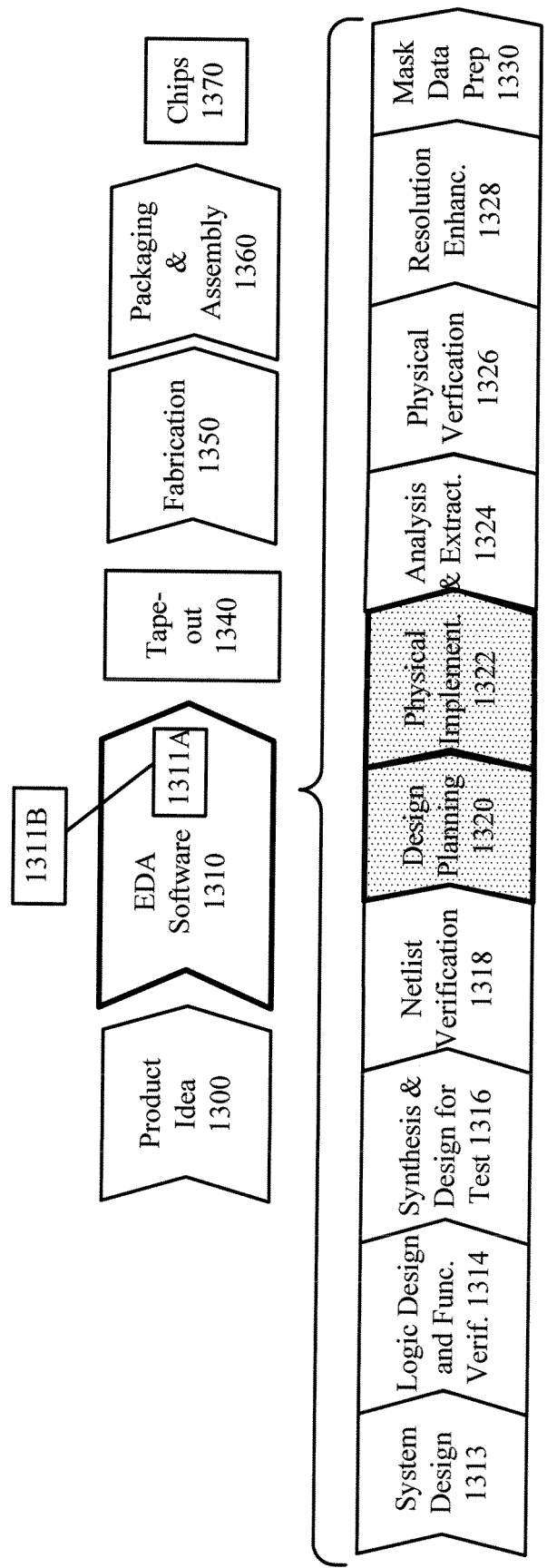
FIG. 13 shows a simplified representation of an exemplary digital ASIC design flow including the above-described DPT conflict repair technique.

FIG. 13 shows a simplified representation of an exemplary digital ASIC design flow including the above-described DPT conflict repair technique. At a high level, the process starts with the product idea (step 1300) and is realized in an EDA software design process (step 1310). When the design is finalized, it can be taped-out (event 1340). After tape out, the fabrication process (step 1350) and packaging and assembly processes (step 1360) occur resulting, ultimately, in finished chips (result 1370).

The EDA software design process (step 1310) is actually composed of a number of steps 1312-1330, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components/steps of the EDA software design process (step 1310) will now be provided. In one embodiment, one or more steps of the EDA software design process can be implemented using a computer-readable medium 1311A, which is read by a computer 1311B. Note that Astro, AstroRail, CustomSim, ESP, Hercules, IC Compiler, Magellan, Model Architect, Power Compiler, PrimeRail, Proteus, ProteusAF, PSMGen, Saber, StarRC, and System Studio are trademarks of Synopsys, Inc., and CATS, DesignWare, Design Compiler, Formality, HSIM, Leda, NanoSim, Primetime, Syndicated, TetraMAX, VCS, and Vera are registered trademarks of Synopsys, Inc.

System design (step 1312): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect™, Saber™, System Studio™, and DesignWare® products.

Logic design and functional verification (step 1314): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include HSIM®, NanoSim®, CustomSim™, VCS®, VERA®, DesignWare®, Magellan™, Formality®, ESP™ and LEDA® products.

Synthesis and design for test (step 1316): Here, the VHDL/ Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler™, Tetramax®, and DesignWare® products.

Netlist verification (step 1318): At this step, the netlist is checked for compliance with timing constraints and for correspondence with the VHDL/Verilog source code. Exemplary EDA software products from Synopsys, Inc. that can be used at this step include Formality®, PrimeTime™, and VCS® products.

Design planning (step 1320): Here, an overall floorplan for the chip is constructed and analyzed for timing and top-level routing. Exemplary EDA software products from Synopsys, Inc. that can be used at this step include Astro™ and IC Compiler™ products. In one embodiment, the above-described DPT conflict repair techniques 800 and 1130 (FIGS. 8 and 11C) can be performed during step 1320.

Physical implementation (step 1322): The placement (positioning of circuit elements) and routing (connection of the same) occurs at this step. Exemplary EDA software products from Synopsys, Inc. that can be used at this step include the Astro™ and IC Compiler™ products. In one embodiment, the above-described DPT conflict repair techniques 800 and 1130 (FIGS. 8 and 11C) can be performed during step 1322.

Analysis and extraction (step 1324): At this step, the circuit function is verified at a transistor level, this in turn permits what-if refinement. Exemplary EDA software products from Synopsys, Inc. that can be used at this step include AstroRail™, PrimeRail™, Primetime®, and Star RC/XT™ products.

Physical verification (step 1326): At this step various checking functions are performed to ensure correctness for: manufacturing, electrical issues, lithographic issues, and circuitry. Exemplary EDA software products from Synopsys, Inc. that can be used at this step include the Hercules™ product.

Resolution enhancement (step 1328): This step involves geometric manipulations of the layout to improve manufacturability of the design. Exemplary EDA software products from Synopsys, Inc. that can be used at this step include Proteus™, ProteusAF™, and PSMGen™ products.

Mask data preparation (step 1330): This step provides the "tape-out" data for production of masks for lithographic use to produce finished chips. Exemplary EDA software products from Synopsys, Inc. that can be used at this step include the CATS® family of products.

Figure 15:
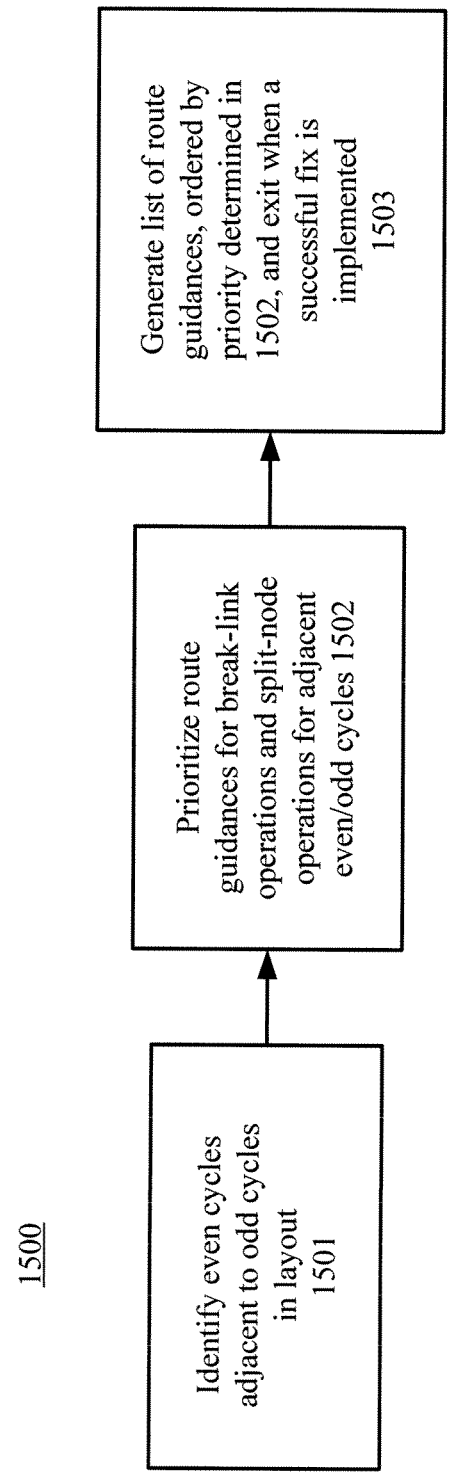
FIG. 15 summarizes a method of performing double patterning (DPT) conflict repairs using both break-link and split-node operations.

FIG. 15 summarizes a method 1500 of performing double patterning (DPT) conflict repairs using both break-link and split-node operations. Step 1501 can include identifying even cycles adjacent to odd cycles in a layout (i.e. adjacent even/odd cycles). Route guidances for break-link operations and split-node operations for the adjacent even/odd cycles can be prioritized in step 1502. Step 1503 can generate a list including the route guidances for the break-link operations and the split-node operations, the list being ordered based on the prioritizing. Step 1503 can be exited when a successful fix is implemented.

As described above in greater detail in reference to FIG. 8, prioritizing the route guidances for the break-link operations can include de-prioritizing a first set of links of the adjacent even/odd cycles that are common between the even cycles and the odd cycles, and prioritizing a second set of links in the odd cycles of the adjacent even/odd cycles.

As described above in greater detail in reference to FIG. 11C, prioritizing the route guidances for the split-node operations can be based on interactions with the adjacent even/odd cycles. Each route guidance is a potential cut having a specific location on a feature represented by a node. An interaction for the potential cut can be calculated by subtracting a first number of even cycles interacting with the potential cut from a second number of odd cycles interacting with the potential cut. In one embodiment, the break-link operations can be prioritized over the split-node operations for the same odd cycle repairs.

Figure 14:
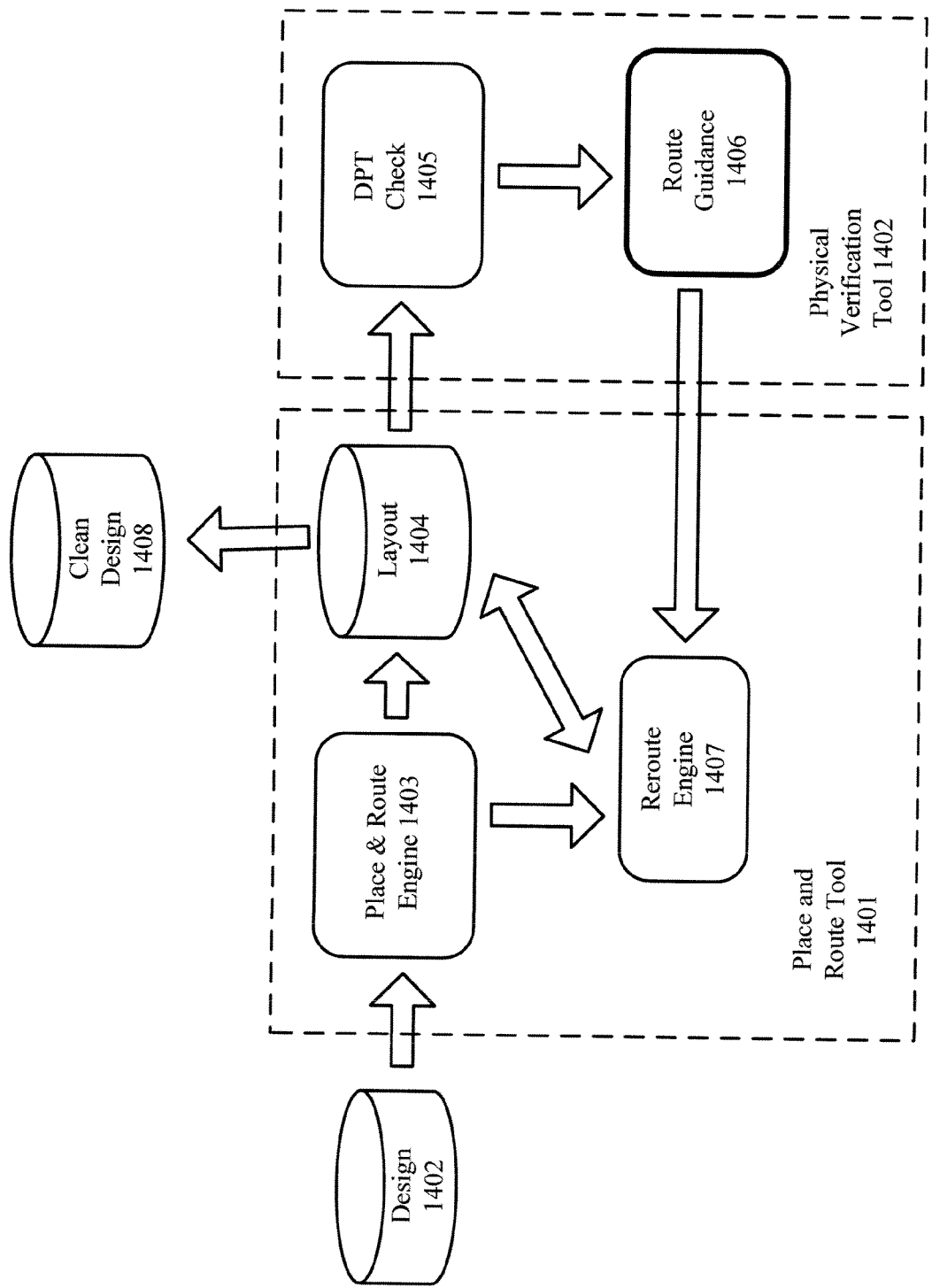
FIG. 14 illustrates an exemplary implementation in which the improved DPT conflict repair technique can be performed by coordinating two tools: a physical verification tool and a place and route tool.

In one exemplary implementation shown in FIG. 14, the above-described DPT conflict repair techniques can be performed by coordinating two tools: a physical verification tool 1402 and a place and route tool 1401. In place and route tool 1401, a place and route engine 1403 can receive a user design 1402 and generate a layout 1404. In physical verification tool 1402, a DPT check block 1405 can receive layout 1404 and detect DPT conflicts. A route guidance block 1406 can receive the detected DPT conflicts and construct specialized route guidance that can be passed to place and route tool 1401 to guide efficient repairs. Place and route tool 1401 can implement such repairs using a reroute engine 1407. In one embodiment, physical verification tool 1402 can be invoked to validate the repairs (i.e. after receiving a modified layout 1404). After validation, a clean design 1408 can be output by place and route tool 1401. Notably, without the automated DPT conflict repair technique described above, and implementable in route guidance block 1406, DPT conflict repairs may be slow to converge, or may fail entirely.

Note that the internal correction mechanism in place and route tool 1401 for fixing short-range DPT conflicts could be expanded to tackle long-range conflicts as well. However, this additional functionality would result in significant increase in memory use. For example, for arbitrarily large odd cycle detection and repair, memory usage would increase by tens of gigabytes, which is an unacceptable cost for commercial implementation. The heuristics to mitigate this increased memory usage would also have corresponding detrimental runtime impact runtime. Therefore, modifying place and route tool 1401 would not be a cost-effective solution.

Additionally, place and route tool 1401 could also impose more conservative routing constraints, thereby eliminating the possibility of creating any odd cycle in the first place. However, this approach would result in much poorer quality of result (QoR) and turn around time (TAT). Notably, either design area would be significantly increased, or routing convergence would be much slower (or altogether impossible). Therefore, more conservative routing constraints are also unacceptable.

Theoretically, DPT conflicts could be repaired manually. However, these odd cycles typically contain many nodes (10-100) and span a large area (tens of microns in extent), and are frequently nested within a network of thousands of additional nodes spanning a much larger area. Therefore, random selection of a node for a repair point virtually always results in a new, large odd cycle. Therefore, manual repair would be an intractable approach for any reasonable design flow.

The various embodiments of the features and implementations of the DPT conflict repair technique described above are illustrative only and are not intended to limit the scope of the invention to the particular embodiments described herein. Thus, the invention is limited only by the following claims and their equivalents.

The invention claimed is:

1. A method of performing double patterning (DPT) conflict repairs, the method comprising:
   identifying even cycles adjacent to odd cycles in a layout, thereby identifying adjacent even/odd cycles;
   de-prioritizing a first set of links of the adjacent even/odd cycles that are common between the even cycles and the odd cycles;
   prioritizing a second set of links in the odd cycles of the adjacent even/odd cycles; and
   using a computer, generating a list of break-link operations associated with the first and second sets of links, the list being ordered based on the de-prioritizing and the prioritizing.

2. The method of claim 1, wherein the de-prioritizing includes assigning a lowest priority to the first set, and wherein the prioritizing includes assigning a highest priority to any links that repair multiple odd cycles, and assigning an intermediate priority to any links of the second set that repair single odd cycles.

3. The method of claim 1, further including:
   determining DPT critical regions of the layout; and
   performing the break-link operations only in the DPT critical regions.

4. The method of claim 1, further including repairing at least one DPT conflict using the list.

5. The method of claim 4, wherein the repairing includes performing multiple break-link operations for one adjacent even/odd cycle.

6. A method of performing double patterning (DPT) conflict repairs, the method comprising:
   identifying even cycles adjacent to odd cycles in a layout, thereby identifying adjacent even/odd cycles;
   prioritizing route guidances for split-node operations based on interactions with the adjacent even/odd cycles, each route guidance being a potential cut having a specific location on a feature represented by a node, wherein an interaction for the potential cut is calculated by subtracting a first number of even cycles interacting with the potential cut from a second number of odd cycles interacting with the potential cut; and
   using a computer, generating a list of the route guidances for the split-node operations, the list being ordered based on the prioritizing.

7. The method of claim 6, wherein the prioritizing includes assigning a lowest priority to any route guidances that only repair a core odd cycle without fixing all nesting cycles simultaneously.

8. The method of claim 6, wherein the prioritizing includes assigning a highest priority to any route guidances that repair multiple odd cycles.

9. The method of claim 6, wherein the prioritizing includes assigning an intermediate priority to any route guidances that repair single odd cycles.

10. The method of claim 6, further including:
determining DPT critical regions of the layout; and
performing the split-node operations only in non-DPT critical regions.

11. The method of claim 6, further including repairing at least one DPT conflict using the list.

12. A non-transitory, computer-readable medium storing computer-executable instructions for performing double patterning (DPT) conflict repairs, the instructions when executed by a processor cause the processor to execute a process comprising:
identifying even cycles adjacent to odd cycles in a layout, thereby identifying adjacent even/odd cycles;
de-prioritizing a first set of links of the adjacent even/odd cycles that are common between the even cycles and the odd cycles;
prioritizing a second set of links in the odd cycles of the adjacent even/odd cycles; and
generating a list of break-link operations associated with the first and second sets of links, the list being ordered based on the de-prioritizing and the prioritizing.

13. The computer-readable medium of claim 12, wherein the de-prioritizing includes assigning a lowest priority to the first set, and wherein the prioritizing includes assigning a highest priority to any links that repair multiple odd cycles, and assigning an intermediate priority to any links of the second set that repair single odd cycles.

14. The computer-readable medium of claim 12, further including:
determining DPT critical regions of the layout; and
performing the break-link operations only in the DPT critical regions.

15. The computer-readable medium of claim 12, further including repairing at least one DPT conflict using the list.

16. The computer-readable medium of claim 15, wherein the repairing includes performing multiple break-link operations for one adjacent even/odd cycle.

17. A non-transitory, computer-readable medium storing computer-executable instructions for performing double patterning (DPT) conflict repairs, the instructions when executed by a processor cause the processor to execute a process comprising:
identifying even cycles adjacent to odd cycles in a layout, thereby identifying adjacent even/odd cycles;
prioritizing route guidances for split-node operations based on interactions with the adjacent even/odd cycles, each route guidance being a potential cut having a specific location on a feature represented by a node, wherein an interaction for the potential cut is calculated by subtracting a first number of even cycles interacting with the potential cut from a second number of odd cycles interacting with the potential cut; and
generating a list of the route guidances for the split-node operations, the list being ordered based on the prioritizing.

18. The computer-readable medium of claim 17, wherein the prioritizing includes assigning a lowest priority to any route guidances that only repair a core odd cycle without fixing all nesting cycles simultaneously.

19. The computer-readable medium of claim 17, wherein the prioritizing includes assigning a highest priority to any route guidances that repair multiple odd cycles.

20. The computer-readable medium of claim 17, wherein the prioritizing includes assigning an intermediate priority to any route guidances that repair single odd cycles.

21. The computer-readable medium of claim 17, further including:
determining DPT critical regions of the layout; and
performing the split-node operations only in non-DPT critical regions.

22. The computer-readable medium of claim 17, further including repairing at least one DPT conflict using the list.

23. A system for performing double patterning (DPT) conflict repairs, the system comprising:
a processor configured to perform a process comprising:
identifying even cycles adjacent to odd cycles in a layout, thereby identifying adjacent even/odd cycles;
de-prioritizing a first set of links of the adjacent even/odd cycles that are common between the even cycles and the odd cycles;
prioritizing a second set of links in the odd cycles of the adjacent even/odd cycles; and
generating a list of break-link operations associated with the first and second sets of links, the list being ordered based on the de-prioritizing and the prioritizing.

24. The system of claim 23, wherein the de-prioritizing includes assigning a lowest priority to the first set, and wherein the prioritizing includes assigning a highest priority to any links that repair multiple odd cycles, and assigning an intermediate priority to any links of the second set that repair single odd cycles.

25. The system of claim 23, further including:
determining DPT critical regions of the layout; and
performing the break-link operations only in the DPT critical regions.

26. The system of claim 23, further including repairing at least one DPT conflict using the list.

27. The system of claim 26, wherein the repairing includes performing multiple break-link operations for one adjacent even/odd cycle.

28. A system for performing double patterning (DPT) conflict repairs, the system comprising:
a processor configured to perform a process comprising:
identifying even cycles adjacent to odd cycles in a layout, thereby identifying adjacent even/odd cycles;
prioritizing route guidances for split-node operations based on interactions with the adjacent even/odd cycles, each route guidance being a potential cut having a specific location on a feature represented by a node, wherein an interaction for the potential cut is calculated by subtracting a first number of even cycles interacting with the potential cut from a second number of odd cycles interacting with the potential cut; and
generating a list of the route guidances for the split-node operations, the list being ordered based on the prioritizing.

29. The system of claim 28, wherein the prioritizing includes assigning a lowest priority to any route guidances that only repair a core odd cycle without fixing all nesting cycles simultaneously.

30. The system of claim 28, wherein the prioritizing includes assigning a highest priority to any route guidances that repair multiple odd cycles.

31. The system of claim 28, wherein the prioritizing includes assigning an intermediate priority to any route guidances that repair single odd cycles.

32. The system of claim 28, further including:
determining DPT critical regions of the layout; and
performing the split-node operations only in non-DPT critical regions.

33. The system of claim 28, further including repairing at least one DPT conflict using the list.

34. A method of performing double patterning (DPT) conflict repairs, the method comprising:
identifying even cycles adjacent to odd cycles in a layout, thereby identifying adjacent even/odd cycles;
prioritizing route guidances for break-link operations and split-node operations for the adjacent even/odd cycles; and
generating a list including the route guidances for the break-link operations and the split-node operations, the list being ordered based on the prioritizing.

35. The method of claim 34, wherein the prioritizing the route guidances for the break-link operations includes:
de-prioritizing a first set of links of the adjacent even/odd cycles that are common between the even cycles and the odd cycles; and
prioritizing a second set of links in the odd cycles of the adjacent even/odd cycles.

36. The method of claim 34, wherein the prioritizing the route guidances for the split-node operations includes:
prioritizing route guidances for the split-node operations based on interactions with the adjacent even/odd cycles, each route guidance being a potential cut having a specific location on a feature represented by a node, wherein an interaction for the potential cut is calculated by subtracting a first number of even cycles interacting with the potential cut from a second number of odd cycles interacting with the potential cut.

37. The method of claim 34, wherein the break-link operations are prioritized over the split-node operations for same odd cycle repairs.

\* \* \* \* \*